United States Patent
Lang et al.

(10) Patent No.: US 7,454,128 B2
(45) Date of Patent: Nov. 18, 2008

(54) EXTERIOR VEHICLE CAMERA

(75) Inventors: Werner Lang, Ergersheim (DE); Jochen Bauer, Ergersheim (DE); Martin Ell, Dietersheim (DE)

(73) Assignee: Lang Mekra North America, LLC, Ridgeway, SC (US)

( * ) Notice: Subject to any disclaimer, the term of this patent is extended or adjusted under 35 U.S.C. 154(b) by 431 days.

(21) Appl. No.: 11/388,133

(22) Filed: Mar. 21, 2006

(65) Prior Publication Data

US 2006/0216020 A1    Sep. 28, 2006

(30) Foreign Application Priority Data

Mar. 22, 2005    (DE)    ............ 20 2005 004 675 U

(51) Int. Cl.
*G03B 15/00* (2006.01)

(52) U.S. Cl. ............... 396/5; 396/25; 396/419; 396/427; 348/81; 348/118; 348/148; 359/507; 359/513

(58) Field of Classification Search ............ 396/5, 396/419, 427, 25; 348/81, 118, 148; 359/507, 359/513
See application file for complete search history.

(56) References Cited

U.S. PATENT DOCUMENTS

| | | | |
|---|---|---|---|
| 4,918,521 A | 4/1990 | Yabe et al. | |
| 5,376,960 A | 12/1994 | Wurster | |
| 6,268,882 B1 | 7/2001 | Elberbaum | |
| 6,507,700 B1 | 1/2003 | Takekuma | |
| 2002/0067424 A1 | 6/2002 | Brunner, Jr. | |
| 2002/0085844 A1 | 7/2002 | Tashiro et al. | |
| 2003/0197210 A1 | 10/2003 | Uchida | |
| 2004/0032668 A1 | 2/2004 | Schaefer et al. | |
| 2004/0114920 A1* | 6/2004 | Rife | 396/535 |
| 2007/0279518 A1* | 12/2007 | Apel et al. | 348/373 |

FOREIGN PATENT DOCUMENTS

| | | |
|---|---|---|
| DE | 297 05 569 U1 | 8/1997 |
| DE | 198 42 828 A1 | 3/2000 |
| DE | 101 09 787 A1 | 10/2002 |
| DE | 102 59 795 A1 | 7/2004 |
| DE | 103 02 590 A1 | 8/2004 |
| EP | 1 381 002 A1 | 1/2004 |

* cited by examiner

*Primary Examiner*—W. B. Perkey
*Assistant Examiner*—Michael A Strieb
(74) *Attorney, Agent, or Firm*—McNair Law Firm, P.A.; Cort Flint

(57) ABSTRACT

An exterior vehicle camera is disclosed for monitoring an operating area of a vehicle comprising a camera housing with a camera module having a camera electronics, and camera optics carried within the housing. A recording opening is formed in the camera housing facing toward a recording direction. A transparent recording window covers the recording opening, and is disposed adjacent a recording end of the camera optics. The camera housing and the recording window are formed from plastic materials having sufficiently identical thermal characteristics so that formation of condensation is reduced within the housing at the recording window.

22 Claims, 2 Drawing Sheets

EXTERIOR VEHICLE CAMERA

BACKGROUND OF THE INVENTION

The invention relates to a vehicular camera for exterior use to monitor a desired area.

Special requirements apply to outdoor cameras because of the influences of weather. In the case of cameras now on the market, such as those sold under the designation MCC Mekra Color Camera by MEKRA Lang GmbH of Ergersheim, Germany, for surveillance purposes on the outside of utility vehicles, the actual camera module is located in a protective camera housing. This camera housing is provided with a recording opening in a "viewing direction" covered with a transparent recording window. The camera module comprises cameral electronics with a CCD module as well as cameral optics. The camera optics is constructed in the form of a cylinder having a first end connected with the camera electronics and a second free end facing towards the recording window. Light falls though the transparent recording window from the object to be recorded upon the free end of the camera optics and is guided by the camera optics upon the CCD module.

In prior exterior vehicle cameras an empty space or void is created between camera housing and camera module due to the configuration of the camera module and of the camera housing. When temperatures fluctuate and, due to air moisture condensation forms in the void, especially on the inside of the glass recording window, and on the camera optics located behind the recording window. This condensate leads to deterioration of image quality to the point of not being usable and may also lead to corrosion of the electronic components.

Also, in case of rain, snow and fog, or when cleaning the utility vehicles, moisture can reach the inside of the camera housing through leaks between the glass recording window and the plastic camera housing and affect the image quality.

It is therefore the object of the present invention to provide a more reliable outdoor camera that ensures a uniform image quality even under extreme weather conditions.

SUMMARY OF THE INVENTION

In prior exterior cameras with a glass recording window and a plastic camera housing the recording window is the coldest area in the camera when temperatures drop. The air moisture contained in the empty space between the camera housing and camera module condensates on the inside of the glass recording window. It has been found according to the present invention that this is due to the difference in physical and/or thermal material characteristics between the glass window and the plastic of the camera housing. Glass has considerably greater heat conductivity than plastic and also a higher specific heat capacity. It has been found that making the recording window of plastic rather than of glass prevents the recording window from being the coldest area in the camera when temperatures drop. According to the present invention, as a consequence the formation of the condensation on the inside of the recording window is prevented. The recording window, as well as the camera housing, is made of plastic, i.e. of materials with identical or similar thermal characteristics such as thermal conductivity, specific heat capacity and heat expansion coefficient.

In an advantageous aspect of the invention, the transparent recording window is connected at the edges of the recording opening by laser welding to the plastic camera housing. Thereby a tighter seal is achieved than the seal between the plastic housing and window.

Preferably, the recording window and the camera housing are made in one piece of transparent plastic. Thereby tightness problems between camera housing and the recording window are eliminated completely.

In another preferred aspect of the invention, the plastic recording window has a recess or depression on the inside into which the second free end of the camera optics extend. This reduces the air volume directly in the front face of the camera optics. Consequently condensate could barely be precipitated in this reduced air volume in case of dropping temperatures and condensate on the second end of the camera optics or in the recess of the recording window.

The empty space between camera module and camera housing may be filled with a molding compound. This measure eliminates completely any moisture containing air from the interior of the camera housing. Consequently no condensate can be precipitated anywhere.

Advantageously, the entire molding compound consists of the same transparent material so that it is possible to pour it into the empty space between camera housing and module and over the free end of the camera optics and thereby the application on the recording window is possible in one work step.

According to another advantage of the invention, the free, second end of the camera optics extends into the transparent molding compound. This ensures that the camera optics is not partially covered up by non-transparent molding compound.

Preferably, the camera optics are surrounded with a rigid protective casing, except for the free end of the camera optics pointing in the recording direction. When filling the empty space between camera housing and camera module with the molding compound, this rigid protective casing prevents the cooling molding compound from affecting the operation of the camera optics due to different heat expansion coefficients between molding compound and camera optics and the thereby occurring thermal tensions.

DESCRIPTION OF THE DRAWINGS

The invention will be more readily understood from a reading of the following specification and by reference to the accompanying drawings forming a part thereof, wherein an example of the invention is shown and wherein.

The construction designed to carry out the invention will hereinafter be described, together with other features thereof.

DESCRIPTION OF A PREFERRED EMBODIMENT

Referring now in more detail to the drawings, the invention will be described in more detail.

Figure 1:
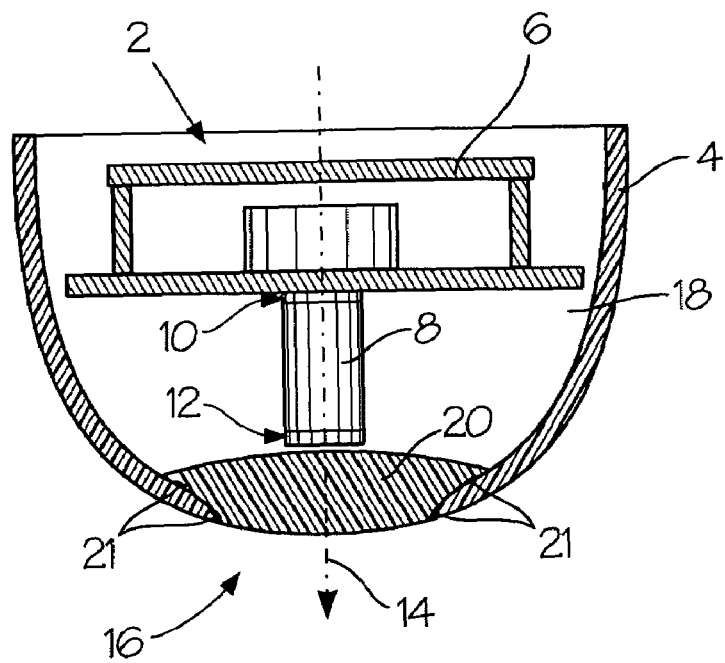
FIG. 1 is a schematic representation of a sectional view illustrating an exterior vehicle camera according to the invention.

FIG. 1 shows a first embodiment of a camera according to the invention with a camera module 2 that is located in a camera housing 4. The camera module 2 comprises camera electronics 6 with a CCD module and camera optics 8. The camera optics 8 comprises a cylinder having a first end 10 facing towards the camera electronics 6 and a second free end 12 facing towards an object to be recorded (not shown) in a recording direction 14. The camera optics 8 are connected to the camera electronics 6 via first end 10. Camera housing 4 has a recording opening 16 through which the second free end 12 of the camera optics 8 may view the object in recording direction 14. Due to the configuration of camera module 2 and of the camera housing 4 a empty space or void 18 is created in camera housing 4 between the housing and camera module 2.

Figure 2:
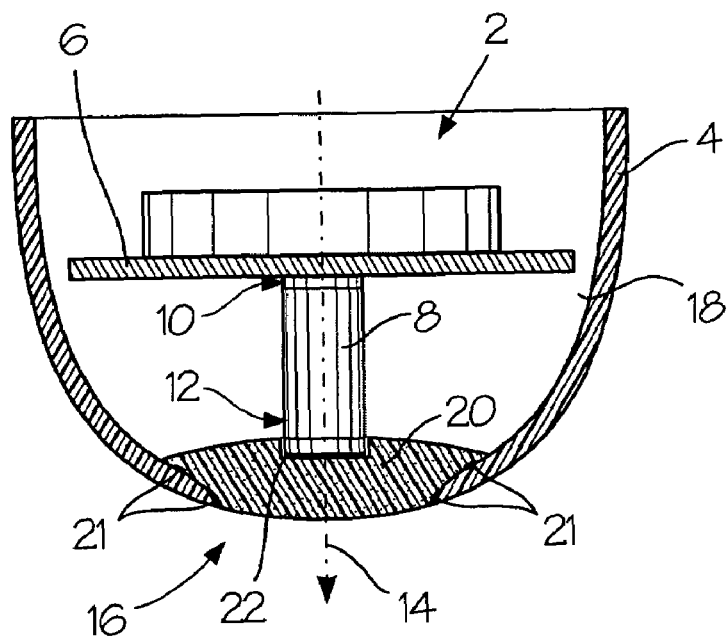
FIG. 2 is a schematic representation of a sectional view illustrating an exterior vehicle camera according to the invention.

Recording opening 16 and camera housing 4 are covered by a transparent plastic recording window 20 so as to be sealed from liquids, water vapor and gas. The recording window 20 is lens-shaped and extends beneath the edges of recording opening 16 in the area of the recording opening. The tight connection between plastic recording window 20 and plastic camera housing 4 is achieved by means of laser welding 21 and the laser welding seam produced thereby (FIGS. 1 and 2). Instead of laser welding it is also possible to use other welding and bonding methods to attach recording window 20. Camera optics 8 at their free end 12 are located directly behind the recording window.

Since both camera housing 4 and recording window 20 are made of plastic materials that have very similar thermal characteristics, the recording window 20 is no longer the coldest component of the camera. Consequently, no condensation is precipitated from the air in the hollow space 18 on the inside of the recording window 20. Preferably, housing 4 is constructed from a plastic material such as a suitable polyurethane. Recording window 20 is constructed from a suitable transparent polyurethane or epoxy resin having identical, or substantially similar, thermal characteristics as the housing material to avoid condensation. When the housing and window are constructed as one-piece, a transparent polyurethane may be used.

Figure 3:
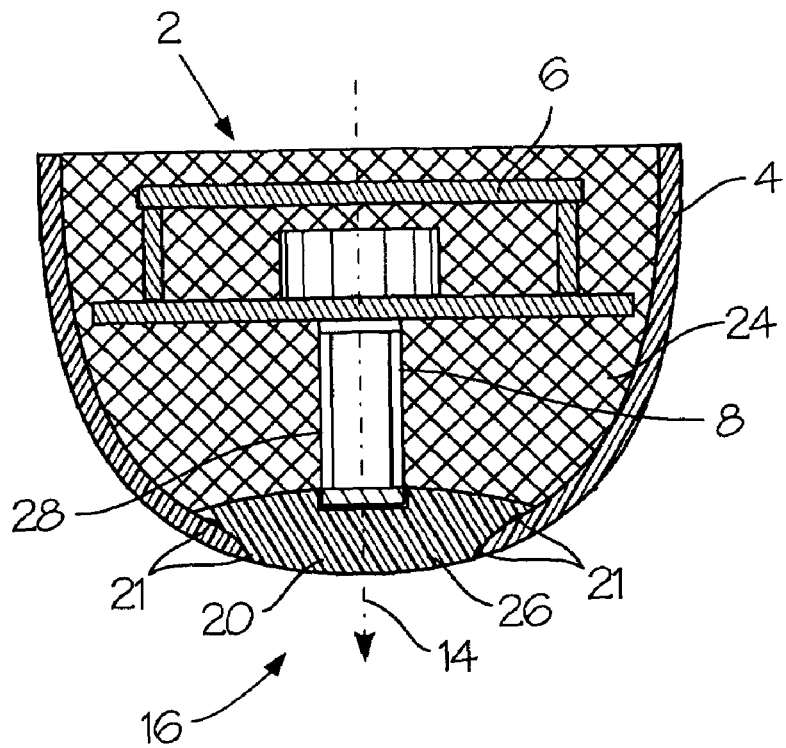
FIG. 3 is a schematic representation of a sectional view illustrating an exterior vehicle camera according to the invention.

FIG. 2 shows a second embodiment of the invention wherein recording window 20 has a recess or depression 22 on the inside whose form is adapted to the form of free end 12 of camera optics 8. In FIG. 3, an embodiment is shown wherein empty space 18 is filled with a molding compound 24. The empty space is filled with molding compound 24 so that only second, free end 12 of the camera optics 8 protrudes from the molding compound 24. The now still remaining empty space 18 in the area of the recording opening 16 is filled or poured full with a transparent molding mass 26. Transparent molding mass 26 thus envelops second, free end 12 of camera optics 8, closes off recording opening 16 in camera housing 4 and thus constitutes transparent recording window 20 in that area.

Since the molding compound 24 and the transparent molding mass 26 fill the empty space 18 completely, sealing the transparent molding mass or recording window 20 off from the camera housing 4 along the edges of recording opening 16 is not critical. Also, by filling empty space 18 completely with the molding compound 24 and 26, air with the moisture it contains is displaced completely from the interior of camera housing 4. As a result, condensation formation that could affect the image quality or the operating capability of the camera electronics can no longer occur.

In order for molding compound 24 to fill out empty space 18 between camera housing 4 and camera module 2 it must be thin and fluid, i.e. comparatively hot. Depending on the molding compound used, the temperature of the liquid molding compound as it is used to fill empty space 18 is within a temperature range of 15° C. and 250° C. In order to prevent the thermal stresses occurring during cooling and solidifying from changing or affecting the camera optics, camera optics 8 is surrounded by a sleeve-shaped cylindrical rigid protective envelope 28. Protective envelope 28 extends from camera electronics 6 to second free end 12 of camera optics 8 whereby the camera optics 8 via second free end 12 views objects in recording direction 14. The rigid protective envelope prevents the thermal stresses from acting directly upon camera optics 8 during solidification. Therefore, the camera optics 8 comes into contact with transparent molding mass 26 only in the region of recording window 20.

The transparent molding mass 26 can be deposited by injection molding, in particular in region of the recording window 20. If only transparent molding mass 26 is filled into empty space 18, filling empty space 18 and forming recording window 20 can take place in one work step. Any hot and cold pouring compound having no adverse effect on the technical and optical characteristics of the camera may be used such as an epoxy resin. In this case, the recording window may also be formed from the epoxy resin, or both may be formed from a suitable polyurethane, provided the polyurethane is transparent in the recording window.

Figure 4:
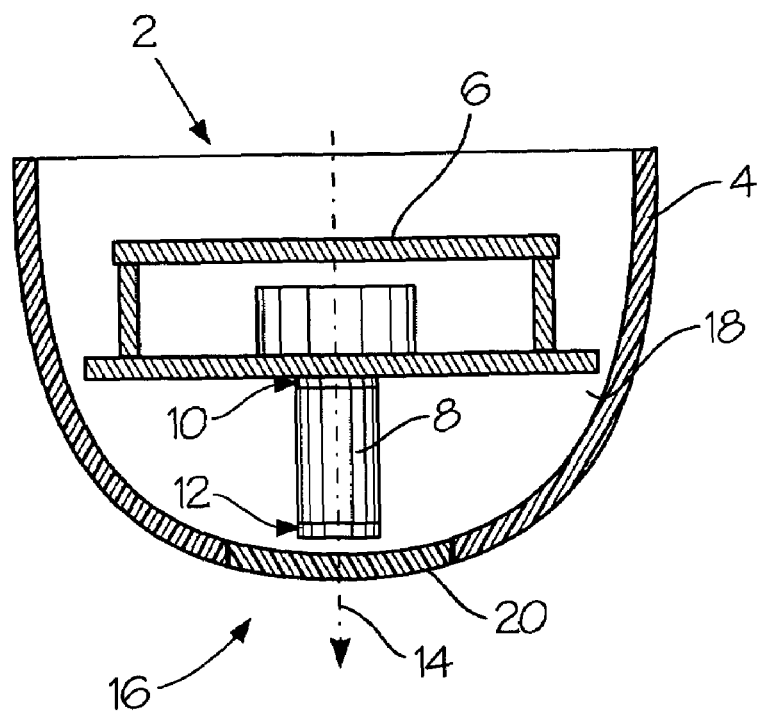
FIG. 4 is a schematic representation of a sectional view illustrating an exterior vehicle camera according to the invention.

FIG. 4 shows a fourth embodiment of the invention where recording window 20 and camera housing 4 are made in one piece, preferably plastic such as a suitable transparent polyurethane. This also prevents recording window 20 from being colder than the camera housing 4. In addition sealing problems between camera housing 4 and recording window 20 are eliminated.

According to the embodiment of FIG. 3, empty space 18 within the camera can be filled with a transparent or nontransparent molding compound. Alternatively, recording window 20 can be provided with a depression on the inside, as in the embodiment of FIG. 2, into which free end 12 of the camera optics extends.

While a preferred embodiment of the invention has been described using specific terms, such description is for illustrative purposes only, and it is to be understood that changes and variations may be made without departing from the spirit or scope of the following claims.

What is claimed is:

1. An exterior vehicle camera for monitoring an operating area of a vehicle which includes a camera module having camera electronics and camera optics disposed within a camera housing, said camera optics having a first end in communication with said camera electronics and a second end extending in a recording direction of the camera, an empty space defined between said camera housing and said camera module, a recording opening formed in said camera housing facing said recording direction, and a transparent recording window covering said recording opening disposed at said second end of said camera optics, wherein said transparent recording window is made of plastic having thermal characteristics similar to the thermal characteristics of said camera housing so that formation of condensation is reduced on said recording window; and a molding compound filling said empty space and encapsulating said camera module within an interior of said housing.

2. The devise of claim 1 wherein said transparent recording window is made integral with said camera housing by means of laser welding.

3. The device of claim 1 wherein said camera housing and said transparent recording window are made in one piece of transparent plastic.

4. The device of claim 1 wherein said transparent recording window includes a recess on an inside which receives said second end of said camera optics with said second end conforming to the shape of said recess.

5. The device of claim 1 wherein said recording window is made of a transparent plastic material.

6. The device of claim 5 wherein said molding compound filling the interior of said camera housing is composed of the same plastic material as said plastic material forming said transparent recording window.

7. The device of claim 5 wherein said plastic material of said transparent recording window surrounds said second, free end of said camera optics.

8. The device of claim 1, including a protective envelope surrounding said camera optics with said second free end of said camera optics remaining free wherein said envelope protects said cameral optics from said molding compound.

9. A vehicle camera for mounting to the exterior of a vehicle for viewing an area near the vehicle comprising:
 a camera housing;
 camera electronics carried within said housing;
 camera optics carried within said housing having a first end operatively connected with said camera electronics and a second end extending in a recording direction;
 a recording opening formed in said camera housing facing toward said recording direction;
 a transparent recording window covering and enclosing said recording opening, said recording window disposed adjacent said second end of said camera optics;
 said camera housing and said recording window being formed from materials having sufficiently identical thermal characteristics so that formation of condensation is reduced within said housing at said recording window, and
 said transparent recording window includes a recess on an inside which receives said second end of said camera optics with said second end conforming to the shape of said recess.

10. The device of claim 9 wherein said camera housing and said transparent recording window are made in one piece of transparent plastic.

11. The device of claim 9 wherein said recording window is made of a transparent plastic material, and said camera housing is made from a plastic material having substantially similar thermal characteristics.

12. The devise of claim 11 wherein said transparent recording window is made integral with said camera housing by means of laser welding whereby said recording opening is sealed around its periphery.

13. The device of claim 9 including a void formed in said camera housing between said camera optics and electronics and said housing, and including a plastic molding compound filling said void and encapsulating said camera optics and electronics within an interior of said housing.

14. The device of claim 13 wherein said molding compound filling the interior of said camera housing is composed of the same plastic material as said plastic material forming said transparent recording window.

15. A method of reducing the formation of condensation in an exterior vehicle camera of the type which includes a camera housing, a camera module carried within said housing having camera electronics and camera optics, said camera optics having a first end operatively connected with said camera electronics and a second end facing toward a recording direction, a void defined between said camera housing and said camera module, a recording opening formed in said camera housing facing toward said recording direction, a transparent recording window covering and enclosing said recording opening, said method comprising:
 forming said cameral housing and said recording window from one of the same plastic material, materials having the same thermal properties, and materials having substantially similar thermal properties.

16. The method of claim 15 including forming said transparent recording window integral with said camera housing by laser welding.

17. The method of claim 15 including forming said camera housing and said transparent recording window as one piece from a transparent plastic material.

18. The method of claim 15 including providing a recess in said transparent recording window which receives said second end of said camera optics.

19. The method of claim 15 including filling said void and encapsulating said camera module with a plastic molding compound.

20. The method of claim 19 including forming said recording window from a transparent plastic material.

21. The method of claim 20 including forming said transparent window from the same plastic material as said plastic molding compound.

22. The method of claim 19 including providing a protective envelope surrounding said camera optics with said second free end of said camera optics remaining free to protect said camera optics from the molding compound process.

* * * * *